United States Patent [19]

Rudenko

[11] 4,263,937

[45] Apr. 28, 1981

[54] SCANNING VALVE

[76] Inventor: Nikolai V. Rudenko, ulitsa Nevskaya, 27, kv. 96, Kiev, U.S.S.R.

[21] Appl. No.: 899,531

[22] Filed: Apr. 21, 1978

[51] Int. Cl.$^3$ ............................................. F16K 11/02
[52] U.S. Cl. .................................... 137/553; 137/554; 137/625.11; 137/625.16; 137/625.19; 137/625.41; 137/625.47; 137/624.18; 73/756
[58] Field of Search ........... 137/553, 554, 555, 625.11, 137/625.15, 626.16, 625.18, 625.19, 625.41, 625.46, 625.47, 624.18; 73/147, 756

[56] References Cited

U.S. PATENT DOCUMENTS

| | | | |
|---|---|---|---|
| 1,616,033 | 2/1927 | Ellison | 137/625.19 |
| 2,312,941 | 3/1943 | Tucker | 137/625.11 |
| 3,502,110 | 3/1970 | Ogilvie | 137/625.11 |
| 3,814,129 | 6/1974 | Cioffi | 137/625.11 |
| 3,881,358 | 5/1975 | Wolfges | 73/756 |

Primary Examiner—William R. Cline

[57] ABSTRACT

A scanning valve for a multi-point gas pressure measuring system, employing a pressure transducer, having a commutator and its drive. The commutator has a stator having an inner space defined by a surface of revolution, a rotor disposed within the inner space and operatively connected to the commutator drive. On the cylindrical surface of the rotor, there are provided annular channels arranged in planes extending at right angle to the rotor axis of rotation and connecting grooves each communicating with one of the annular channels. The stator is provided with inlet ports arranged in groups along the rotor axis of rotation and in each group-within the length of one connecting groove, as well as with outlet ports communicating with the annular channels.

7 Claims, 17 Drawing Figures

SCANNING VALVE

FIELD OF APPLICATION

The present invention relates to measuring devices and more particularly to a scanning valve for a multi-point gas pressure measuring system, employing pressure transducers.

The invention can be used in pneumatic measuring systems for aerodynamic tests, specifically for model wind tunnel tests, study of air-gas ducts of gas-turbine engines, as well as for investigations of other pneumatic gasodynamic systems.

BACKGROUND OF THE INVENTION

Reliability and speed of response are among the most important characteristics of scanning valves used in multi-point gas pressure measuring systems for aerodynamic tests. The apparatus used in the tests must meet contradictory requirements of increasing the number of pressure sensing points and reducing the size of the scanning valve arranged inside the wind-tunnel models.

Known in the art are scanning valves (see Scanivalve Inc. USA, General Catalog, Oct. 30, 1972) comprising a stator and a rotor pressed thereagainst with its end face. The stator has an outlet port in the center and inlet ports in the periphery. The inlet ports alternately communicate with the outlet passage made in the rotor, as the latter rotates relative to the stator. The outlet port communicates with a pressure transducer. The rotor is driven by a step drive.

In operation, gas pressure applied to the rotor urges it away from the stator, which action may unseal the space formed by the ports of the stator and the passage of the rotor.

To balance this force, a counterpressure is generated in the scanning valve inner space of a value approximately equal to the average value of gas pressure being measured and controlled at a given moment. The counterpressure is generated by means of a special pressure source which complicates the scanning valve construction and lowers its reliability.

The above scanning valves are made with 24 and 48 inlet ports. Further increase in the number of ports involves considerable technological difficulties and leads to a significant increase in the weight and size of the commutator. If a greater number of points must be pressure-sensed, the use is made of sets of several computer-controlled commutators.

The stepped rotation of the rotor is a source of increased dynamic loads on the scanning valve components, which limits the speed of response of the scanning valve.

Known in the art is a scanning valve (see USSR Inventor's Certificate No. 290188, Int. Cl. 2 G01 L 19/00) having a hollow cylindrical stator provided with a helical groove on the inner surface.

The helical groove has inlet ports through which pressure being sensed is applied to the interrogating electromagnetic valve installed on the axle of the rotor moving along the helical groove and connected to a pressure transducer by means of a coil pipe. The rotor is intermittently shifted axially along the stator by means of an electromagnetic drive having a ratchet-and-pawl gear and a differential reduction gear.

During commutation of one of the inlet ports the electromagnetic valve is pressed against the inner surface of the stator overcoming the force developed by gas pressure in this inlet port. Friction forces arising at the stator-to-rotor interface are such as to prevent sliding of the electromagnetic valve over the stator surface. For commutation of the next inlet port, the electromagnetic valve is switched off, moved away from the stator surface, turned by an electromagnetic drive and again pressed against the stator surface. Forces from the electromagnetic valve are taken up by the rotor axle.

As the gas pressure increases, in accordance with the above procedure, the force developed by the electromagnetic valve must be increased which results in an increased mass of the electromagnetic valve and inertia of the rotor.

The speed of response of the above scanning valve is relatively small because of the intermittent operation of the drive electromagnet and electromagnetic valves and due to considerable masses of intermittently moving assemblies.

An intricate design of the rotor causes an increase in the stator size, and consequently the whole scanning valve is bulky, which impedes its use in aerodynamic tests, particularly in model wind tunnel tests of aircraft.

Intermittent operation of the scanning valve assemblies reduces the reliability and service life of the scanning valve as a whole.

In the above scanning valve, the number of the inlet ports being sensed is determined by counting electric pulses fed to the electromagnetic valve. For this reason, in case of an eventual failure of the valve to operate the reliability of identification of the number of the scanning valve inlet ports being sensed and of the value of the measured gas pressure materially decreases.

SUMMARY OF THE INVENTION

It is an object of the present invention to increase the number of ports connected to the scanning valve and simplify the scanning valve construction.

Another object of the invention is to increase the reliability of the scanning valve.

Still another object of the invention is to increase the speed of response of the scanning valve.

An additional object of the invention is to reduce the size of the scanning valve.

A further object of the invention is to improve the reliability of identification of the number of port connected to the scanning valve and the value of gas pressure being sensed.

These and other objects are attained in a scanning valve for a multi-point gas pressure measuring system having pressure transducers, the scanning valve comprising a commutator having a stator with an inner space defined by a surface of revolution, inlet ports and outlet ports through which the inner space of the stator communicates with the pressure transducers. The rotor is arranged within the inner space of the stator cooperating with the surface defining the inner space of the stator and intermittently connecting the pressure transducers to the inlet ports, a commutator drive, operatively connected to the rotor. In accordance with the invention, the rotor has a cylindrical surface provided with annular channels communicating with the outlet ports and disposed in planes extending at right angles to the rotor axis of rotation. The connecting grooves, each communicate with one annular channel and sequentially connect the annular channels during rotor rotation to the inlet ports arranged in groups along the rotor axis of rotation. The inlet ports of each group being disposed within the limits of the length of one connecting groove.

The angles between the axes of adjacent inlet ports of each group in planes extending at right angles to the rotor axis of rotation are preferably equal to one another, the neighboring groups of inlet ports are unidirectionally staggered relative to one another around the rotor axis of rotation at an angle $\alpha$, and each next connecting groove is unidirectionally staggered relative to the preceding one around the rotor axis of rotation at an angle $\beta$, and $\beta - \alpha = \gamma/(k+j)$, where $\gamma$ is the angle between the axes of adjacent inlet ports of one group, k is the number of groups of the inlet ports, j = 1, 2, 3.

The scanning valve is preferably provided with a timing generator made in the form of a shaft position transducer operatively connected to the rotor and generating pressure transducer interrogation signals, and the commutator drive comprises a continuous rotary drive.

The timing generator of the scanning valve is preferably provided with a light source, photosensitive cells and a code mask therebetween in the form of k+j groups of apertures in a cylindrical envelope of a code bell operatively connected to the rotor, the apertures being arranged in planes extending at right angle to the code bell axis of rotation the neighboring groups of apertures being staggered relative to one another at an angle $$\delta = \frac{\gamma}{k+j} i,$$

where i is the gear ratio of the operative connection between the rotor and the code bell, and the angles $\theta$ between adjacent apertures in k groups are derived from the formula $\theta = \gamma \cdot i$.

The code bell of the scanning valve is preferably rotatable about the rotor, and the light source with the photocells is rotatable about the code bell to provide for coarse and fine adjustment of the moments of generation of interrogation signals for the pressure transducers.

The scanning valve is preferably provided with an indicator of the number of the connected port of the commutator comprising a shaft position transducer operatively connected to the rotor.

The indicator of the number of connected port of the commutator is preferably provided with a light source, photocells, a code bell operatively connected to the rotor and having a cylindrical envelope with groups of apertures disposed in planes extending at right angles to the code bell rotation axis and forming a code mask located between the light source and photocells.

BRIEF DESCRIPTION OF THE DRAWINGS

The nature of the invention will now be explained in greater detail in terms of specific embodiments with reference to the accompanying drawings, in which.

DESCRIPTION OF THE PREFERRED EMBODIMENTS

Figure 1:
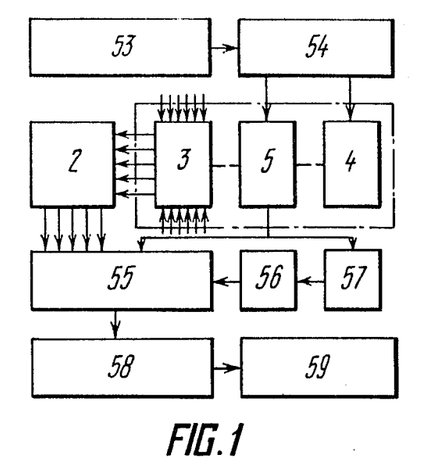
FIG. 1 shows a structural diagram of the multi-point gas pressure measuring system comprising a scanning valve having a timing generator, according to the invention.

The scanning valve 1 (FIG. 1) according to the invention may be advantageously used in a multi-point gas pressure measuring system having pressure transducers 2 structurally connected to the scanning valve 1. The scanning valve 1 may be made in two principal embodiments.

Figure 2:
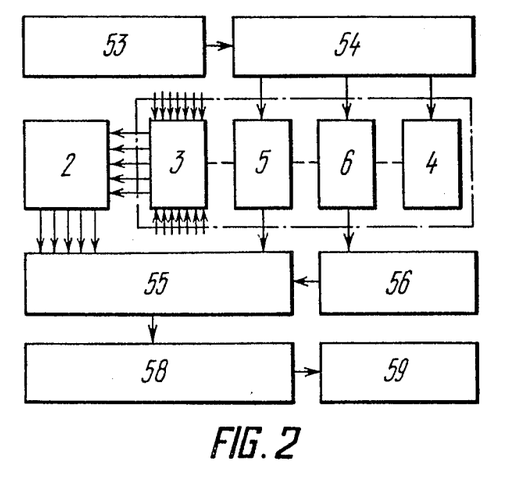
FIG. 2 shows a structural diagram of the multi-point gas pressure measuring system, comprising a scanning valve having a timing generator and an indicator of the number of the connected inlet port of the commutator, according to the invention.

According to the first principal embodiment, the scanning valve 1 is provided with a commutator 3, a commutator drive 4 and a timing generator 5, and in the second principal embodiment it is provided with a commutator 3, a timing generator 5 and indicator 6 of the connected port of the commutator 3 (FIG. 2).

The commutator 3 has a stator 7 (FIG. 3) made in the form of a hollow circular cylinder with a cylindrical rotor 8 slide-fitted in the inner space thereof. Five annular channels 9 are made in the surface of the rotor 8 in planes extending at right angles to the axis of rotation thereof, and five connecting grooves 10 are made along the axis of rotation of the rotor 8 and disposed along the common generatrix line a—a of rotor 8, each of the connecting grooves 10 communicating with one annular channel 9. The stator 7 is provided with inlet ports 11 which are scanning valve inlets arranged in groups 12 along the axis of rotation of the rotor 8, outlet ports 13 arranged in the planes of the annular channels 9 (FIG. 4), one per each annular channel, and communicating therewith.

The inlet ports 11 (FIG. 3) of one group 12 are disposed within the limits of the length of one connecting groove 10.

Figure 5:
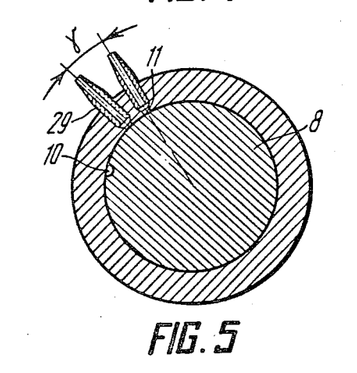
FIG. 5 is a section of the commutator, according to the invention.

The angles γ (FIG. 5) between the adjacent inlet ports 11 of each group 12 in planes extending at right angles to the axis of rotation of the rotor 8 are equal to one another.

Figure 3:
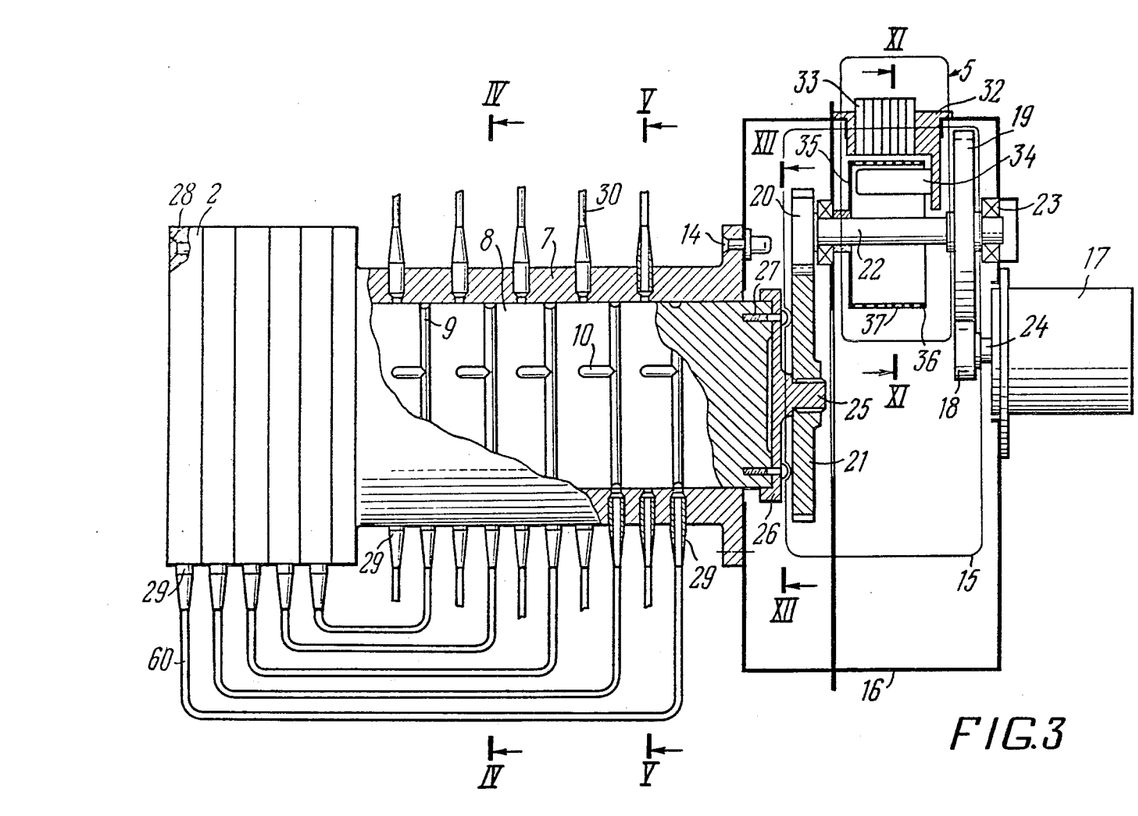
FIG. 3 is a general view of the scanning valve partially in partial section, according to the invention.
Figure 4:
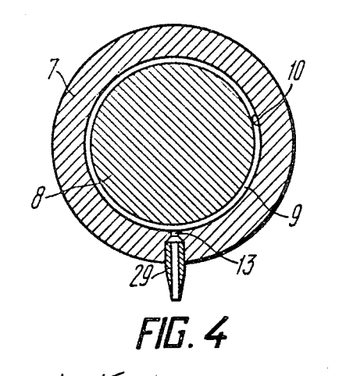
FIG. 4 is a section of the commutator, according to the invention.

The like inlet ports 11 of all the groups 12 are disposed along the generatrix lines b—b of the stator 7 (FIG. 3).

Figure 6:
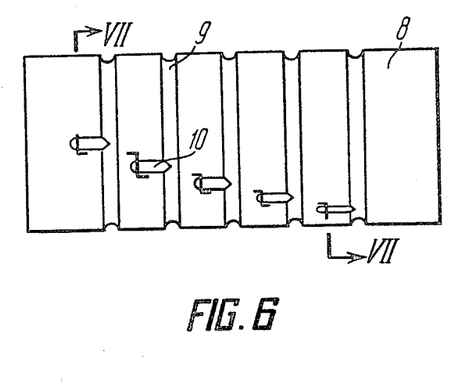
FIG. 6 is a general view of the rotor, according to the invention.
Figure 7:
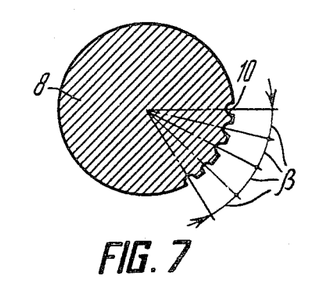
FIG. 7 is a section of the rotor, according to the invention.

In the preferred embodiment of the scanning valve 1, each next connecting groove 10 of the rotor 8 is staggered relative to the preceding one around the axis of rotation of the rotor 8 at an angle β (FIGS. 6, 7) which is derived from the formula:

$$\beta = \gamma/k+j \tag{1}$$

where γ the angle between the adjacent inlet ports 11 of each group 12; k the number of the groups 12 of the inlet ports 11; j is equal to 1, 2, 3.

Figure 8:
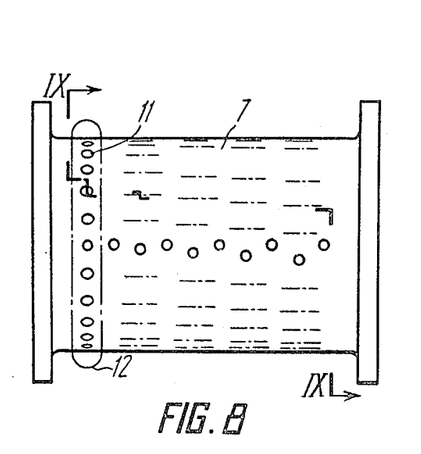
FIG. 8 is a general view of the stator, according to the invention.
Figure 9:
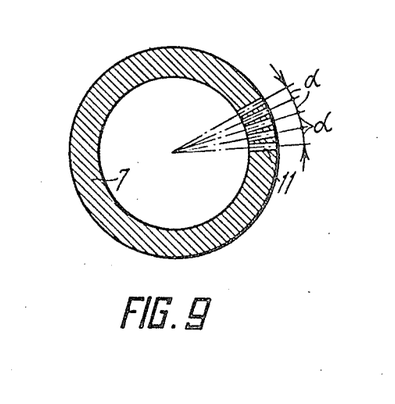
FIG. 9 is a section of the stator, according to the invention.

In an alternative embodiment of the invention, the scanning valve 1 is characterized in that the neighboring groups 12 of the inlet ports 11 are unidirectionally staggered relative to one another around the axis of rotation of the rotor 8 at an angle α derived from the same formula (1) (FIGS. 8, 9), and the connecting grooves 10 are arranged along the generatrix a—a of the rotor 8 (β=0).

In another embodiment of the invention both the connecting grooves 10 and the groups 12 of the inlet ports 11 of the scanning valve 1 are staggered. The following relationship holds for all the embodiments of the scanning valve 1:

$$\beta - \alpha = \gamma/(K+j), \alpha \geq 0, \beta \geq 0 \tag{2}$$

The commutator drive 4 comprising a double-reduction gear 15 installed in a housing 16 and an electric motor 17 mounted on the housing 16 is attached by means of screws 14 to the end face of the stator 7 (FIG. 3). The double-reduction gear 15 comprises gear wheels 18, 19, 20 and 21, both the gear wheels 18, 19 and 20, 21 meshing each other, respectively and the gear wheels 19 and 20 being interconnected by means of an axle 22 journalled in bearings 23 of the housing 16. The gear wheel 18 is secured to a shaft 24 of the electric motor 17, and the gear wheel 21 is fitted on an axle 25 of a cover plate 26 attached to the rotor 8 by means of screws 27.

Five pressure transducers 2, one per each group 12 of the inlet ports 11, are attached by means of screws 28 to the opposite end face of the stator 7. The inlet ports 11, the outlet ports 13 and the pressure transducers 2 are fitted with connectors 29. Each outlet port 13 is connected through the connector 29 and a pipeline 30 to one of the pressure transducers 2.

The timing generator 5 is installed in an opening 31 of the housing 16. Secured to a casing 32 of the timing generator 5 are photocells 33 and a light source 34. The timing generator 5 also comprises a code bell 35 mounted on the axle 22. A cylindrical envelope 36 of the code bell 35 has apertures 37 which form a code mask 38 (FIG. 10) of the generator 5. The light source 34 (FIG. 3) is disposed inside the cylindrical envelope 36, and the photocells 33 are arranged outside the cylindrical envelope 36. The casing 32 (FIG. 11) is provided with flanges 39 by means of which it is secured to the housing 16 with screws 40.

Due to arcuate holes 41 (FIG. 12) used to secure the cover plate 26 to the rotor 8, the generator 5 can be roughly adjusted in position. Elongated holes 42 (FIG. 11) for screws 40 provide for a fine adjustment of the generator 5.

Figure 10:
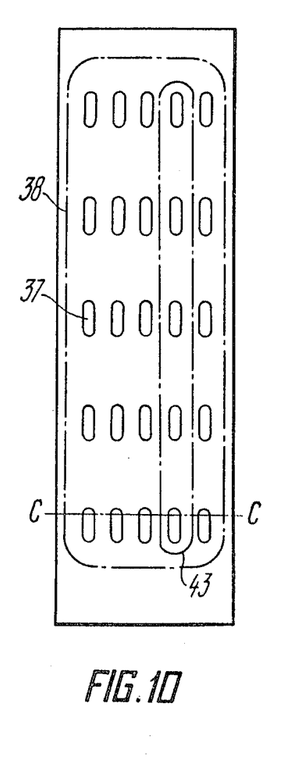
FIG. 10 is a developed cylindrical surface of the code ball, according to the invention.
Figure 11:
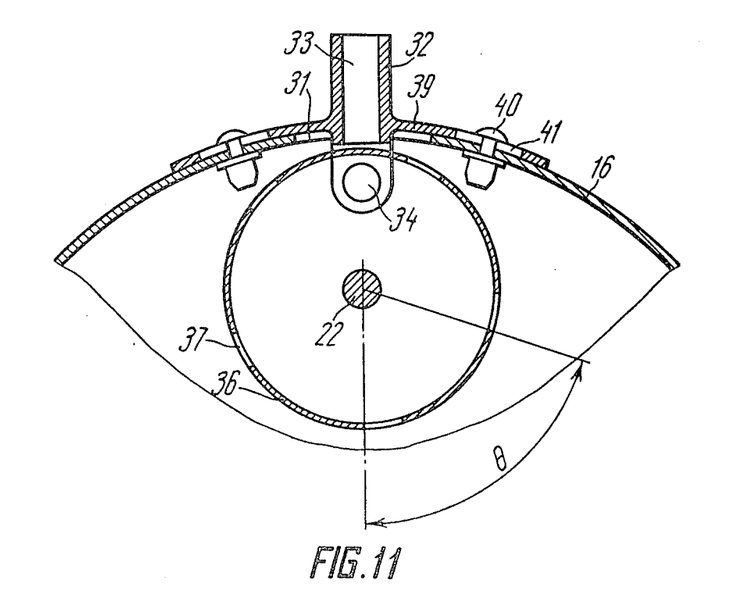
FIG. 11 is a section of the housing with the timing generator installed therein, according to the invention.

The apertures 37 which form the code mask 38 are arranged in groups 43 (FIG. 10) in planes extending at right angles to the axle 22 (FIG. 3). One of the photocells 33 is arranged in each of the planes. The number of the groups 43 is equal to k+j. In the scanning valve embodiment illustrated in FIG. 3 k=5, j=2. The like apertures 37 of the groups 43 are disposed along common generatrix lines c—c of the cylindrical envelope 36 (FIG. 10). The angles θ between neighboring apertures 37 of one group 43 are equal to one another and are derived from the formula:

$$\theta = \gamma \cdot i, \tag{3}$$

where i is gear ratio of the operative connection between the rotor 8 and the code bell 35, i.e. $i=Z_{21}/Z_{20}$, where $Z_{21}$ is the number of teeth of the gear wheel 21, and $Z_{20}$ is the number of teeth of the gear wheel 20.

Figure 13:
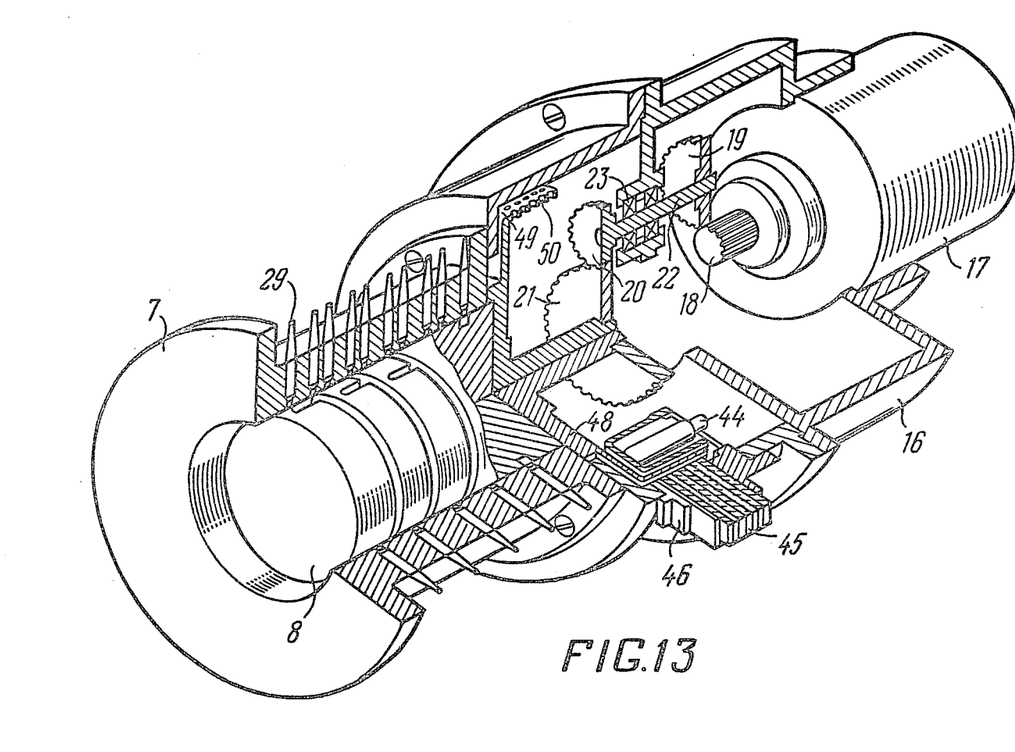
FIG. 13 is a perspective view of the scanning valve, according to the invention.

The preferred embodiment of the timing generator 5 is such in which the code bell 35 of the generator 5 is rigidly secured to the cover plate 26 (FIG. 13). In this case, the code mask will be similar to the code mask 38 (FIG. 14) at i=1.

Figure 14:
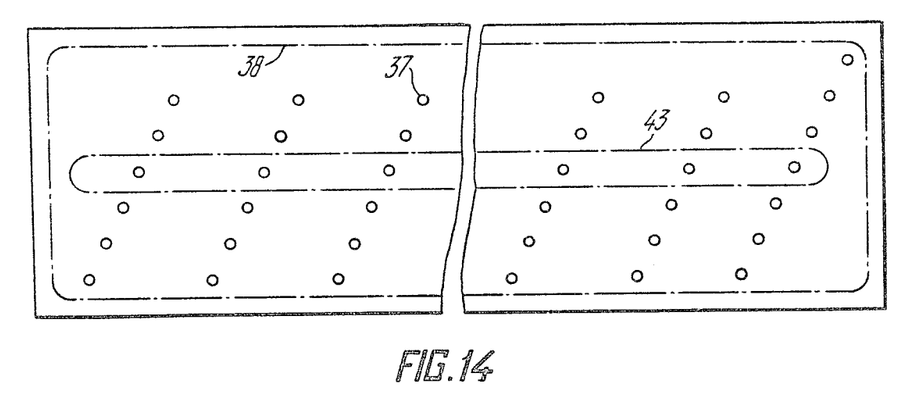
FIG. 14 is a developed cylindrical envelope of the code bell of the timing generator, according to the invention.

In an alternative embodiment of the scanning valve 1 with a staggering of the connecting grooves 10 or the groups 12 of the inlet ports 11 (see FIGS. 6, 7, 8, 9), the groups 43 of the aperatures 37 of the code mask 38 of the generator 5 are also staggered relative to one another at an angle δ (FIG. 14) derived from the formula:

$$\delta = \frac{\gamma}{k+j} i \tag{4}$$

The indicator 6 of the number of connected ports according to the second principal embodiment of the scanning valve 1 (FIG. 15) has a light source 44 and photocells 45 installed on a casing 46 fitted in an opening 47 of the housing 16, and a code bell 48. The code bell 48 is made integral with the cover plate 26; it has a cylindrical envelope 49 with the light source 44 disposed in the interior thereof, and the photocells 45 disposed in the exterior thereof. The cylindrical envelope 49 has apertures 50 which form a code mask 51 (FIG. 16) of the indicator 6 of the number of the connected ports of the commutator. The code mask includes numbers of the inlet ports 11 of the first group 12, written in the form of a binary-decimal code. In this alternative embodiment of the scanning valve, each group 12 has sixty inlet ports 11 (FIG. 15) arranged in a staggered pattern with the aim of increasing the number of inlet ports in the group 12, while having bridges between the adjacent inlet ports 11 of one group 12 of minimum admissible size.

The apertures 50 (FIG. 15) of the code mask 51 are arranged in groups 52 disposed in planes extending at right angles to the axis of rotation of the code bell 48. One of the photocells 45 is positioned in each of these planes.

In the first embodiment of the scanning valve 1 (FIG. 3), the multi-point gas pressure measuring system comprises a power supply unit 53 (FIG. 1) which supplies power through a control board 54 to the drive 4, timing generator 5, electromechanical commutator 55 having inputs connected to the outputs of the pressure transducers 2 and of an analog digital converter 56 connected, via a pulse counter 57, to the generator 5. The output of the electromechanical commutator 55 is connected to a measuring apparatus 58 connected to a recording apparatus 59.

In the multi-point gas pressure measuring system for the second embodiment of the scanning valve (FIG. 15), the output of the timing generator 5 is only connected to the electromechanical commutator 55 (FIG. 2), and the input of the analog digital converter 56 is connected to the indicator 6 of the number of connected ports of the commutator. In other respects both pressure measuring systems are similar.

The scanning valve according to the invention operates in the following way: pressures being sensed are fed to the inlet ports 11 through pipelines 60 connected to the connectors 29.

The power supply unit 53 supplies power at a required voltage level to the scanning valve 1 and to other components of the pressure measuring system. The drive 4 of the commutator by a command from the control board 54 causes rotation of the rotor 8 which sequentially connects the pipelines 60 (FIG. 3), which are under pressure to be measured, to the pressure transducers 2 through the outlet ports 13 and the pipelines 30. The pressure transducers 2 convert the pressure being sensed into electrical signals and feed them to the input of the electromechanical commutator 55 which supplies them in a certain order determined by a command from the timing generator 5 to the measuring apparatus 58 and the recording apparatus 59. According to the first principal embodiment of the scanning valve (FIG. 3), the number of connected ports of the commutator is determined in the following way: signals from the timing generator 5 are fed to the pulse counter 57, therefrom in the binary-decimal code to the analog digital converter 56, and then in the analog form to the electromechanical commutator 55 which feeds them to the measuring apparatus 58 and the recording apparatus 59. In the second embodiment of the scanning valve 1 (FIGS. 2, 15) signals from the indicator 6 of the number of connected ports in the binary-decimal code are fed to the analog digital converter 56 and then they are applied in the analog form to the electromechanical commutator 55.

During operation of the scanning valve 1, the electric motor 17 (FIG. 3) of the drive 4 rotates the rotor 8 through the double-reduction gear 15.

Figure 17:
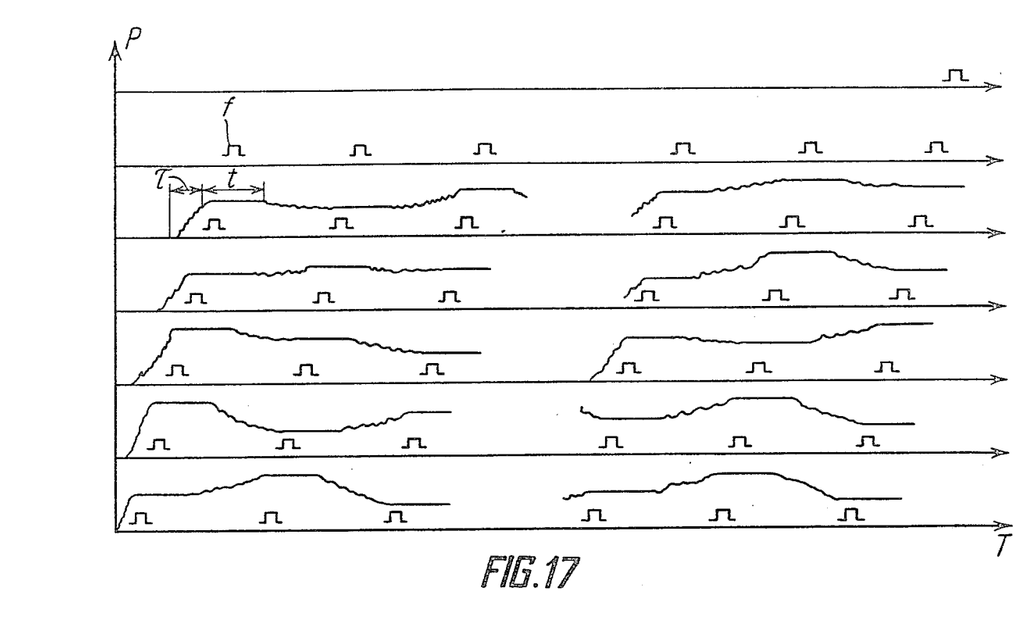
FIG. 17 is a scanning valve operation cyclogram, according to the invention.

The connecting grooves 10 sequentially pass by the inlet ports 11, thereby connecting the pipelines 60 through the annular channels 9 and the pipelines 30 to the pressure transducers 2. During the time when the connecting groove 10 passes by the inlet port 11, pressures in the pipeline 60 and the pressure transducer 2 become equal. This process occurs during a time period $\tau$ (FIG. 17). The length of the time period $\tau$ limits the speed of rotation of the rotor 8, since pressures in the pipelines 60 and the pressure transducers 2 cannot become equal during a shorter period. Simultaneously with the rotor 8 the code bell 35 (FIG. 3) of the timing generator 5 secured on the axle 22 of the double-reduction gear 15 also rotates. After a lapse of time $\tau$ since the connecting groove 10 began to pass by the inlet port 11, the aperture 37 of the cylindrical envelope 36 of the code bell 35 passes between the light source 34 and the photocell 33. The generator 5 supplies a signal f (FIG. 17) for interrogation of the pressure transducer 2 to the electromechanical commutator 55. The pressure transducer 2 is interrogated after the pressure therein becomes equalized the connecting groove 10 and the inlet port 11 communicating with each other, or when the connecting groove 10 is positioned against the bridge between the adjacent inlet ports 11. Selection of one or the other mode of operation depends on the required accuracy of measurements and test conditions.

Figure 12:
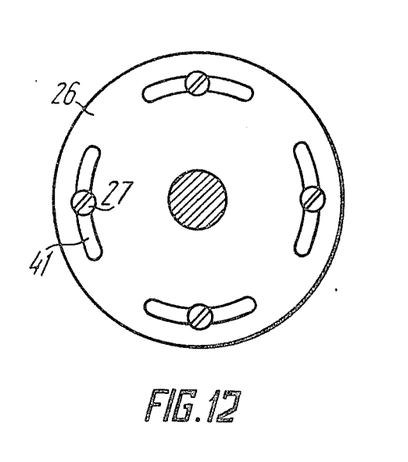
FIG. 12 shows the attachment of the cover to the rotor, according to the invention.

Moments of generating the interrogation signals for the pressure transducers 2 are adjusted either by displacing the casing 32 of the timing generator 5 (FIG. 3) or by displacing the cover plate 26 relative to the rotor 8, after loosening the screws 40 (FIG. 11) and 27 (FIG. 12). After the adjustment the screws 40 and 27 should be tightened.

In the alternative embodiment of the scanning valve 1 illustrated in FIG. 3 the connecting grooves 10 of the rotor 8 are arranged along the common generatrix line a—a, and the like inlet ports 11 are arranged along the common generatrix lines b—b of the stator 7, respectively, and the apertures 37 of the code mask 38 (FIG. 10) are made along the generatrix lines c—c of the code bell 35 (FIG. 3). Due to such an arrangement, the connecting grooves 10 simultaneously connect one inlet port 11 of each group 12, and the timing generator 5 feeds signals for simultaneous interrogation of the pressure transducers 2. The order of pressure measuring and recording is determined by the electromechanical commutator 55.

More suitable is the alternative embodiment of the scanning valve 1 with the staggered connecting grooves 10 of the rotor 8 (FIGS. 6, 7). In this embodiment of the scanning valve 1, the connecting grooves 10 on the rotor 8 sequentially connects one inlet port 11 of each group 12 at a time, while the generator 5 feeds signals for sequential interrogation of the pressure transducers 2. Operation of the scanning valve 1 in this embodiment is illustrated by the cyclogram (FIG. 17) which shows seven groups of signals f corresponding to seven groups of the apertures 37 of the code mask 38 of the timing generator 5 with k=5 and j=2. The first five groups of the signals f are used for interrogation of the pressure transducers 2, the sixth group of the signals f is intended for interrogation of additional transducers, for example, a dynamic head sensor in the wind tunnel. In the seventh group, there is one signal f, which corresponds to one aperture in the seventh group 43 (FIG. 14) of the apertures 37 of the code mask 38 (FIG. 10). Its function is to generate a stop signal for the commutator drive 4.

In an alternative embodiment of the scanning valve 1 (FIG. 15) the sixth group of the signals f is used for interrogation of the indicator 6 of the number of connected ports of the commutator generating the number of the connected ports when the apertures 50 of the code bell 48 pass between the light source 44 and the photocells 45. The indicator 6 of the number of connected port generates the numbers of the inlet ports 11 in the entire first group 12, whereupon pressure is measured in all like inlet ports 11 of the groups 12. Then the next number is generated, and the following like inlet ports 11 of the groups 12 are interrogated.

Figure 15:
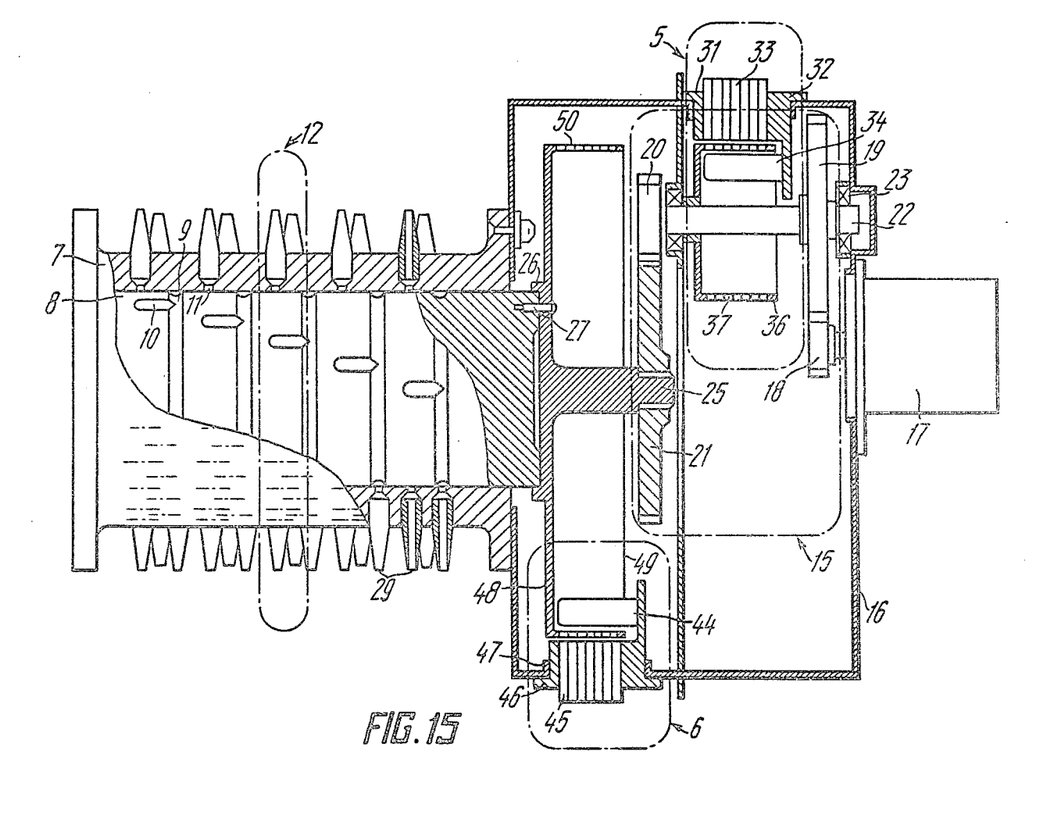
FIG. 15 is a general view of the scanning valve having a timing generator and an indicator of the number of the connected inlet port of the commutator, according to the invention.
Figure 16:
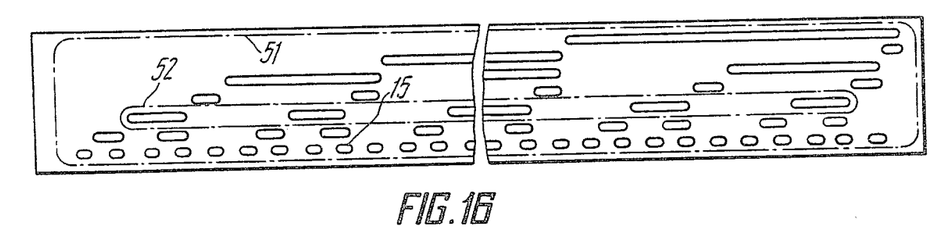
FIG. 16 is a developed cylindrical envelope of the code bell of the indicator of the number of the connected port of the commutator, according to the invention.

In other respects, operation of the scanning valve 1 in this embodiment is similar to that described above.

The scanning valve 1 according to the invention is suited for operation in other pressure measuring systems, specifically, with a universal computer. In certain cases, the step drive of the commutator can also be used.

The above-described construction of the scanning valve makes it possible to enhance its reliability and speed of response. The use of the scanning valve in a multi-point gas pressure measuring system provides for attainment of the required confidence level in the identification of number of connected ports of the commutator and of the magnitude of pressure being sensed. The commutator of the disclosed scanning valve may be provided with hundreds of inlet ports and have a size which will enable its installation inside wind tunnel models.

What is claimed is:

1. A scanning valve for a multi-point gas pressure measuring system, comprising a commutator including a stator having a cylindrical inner space receiving a cylindrical rotor, said stator having a plurality of inlet ports, each of which is connected to different pressure measuring points and which are arranged in groups along the generating line of the cylindrical surface, an outlet port being provided next to each of said groups, each of the outlet ports being connected to its respective pressure transducer converting pressure into an electrical signal, and said rotor having annular channels on its cylindrical surface under each of the outlet ports of the stator, in planes normal to the rotation axis of the rotor, and commutating grooves arranged along the generating line of the rotor surface and each having a length that is limited by the width of the adjacent group of inlet ports, said grooves forming, together with the annular channels, closed spaces, each of which is permanently connected with one of the outlet ports and coupled, during rotor rotation, successively with each of the inlet ports of one group; a drive for rotating the rotor of the commutator; a pressure measuring signal generator coupled kinematically with the rotor of the commutator to generate command signals at moments when each of the commutating grooves is connected to each of the inlet ports.

2. A scanning valve as claimed in claim 1, wherein: said annular channels are located on said surface of the cylindrical inner space of the stator.

3. A scanning valve as claimed in claim 1, wherein: said inlet ports in each group are arranged along the perimeter of said cylindrical inner space of the stator at an identical angular pitch $\gamma$ around the rotation axis of the rotor, each said group of inlet ports being unidirectionally staggered relative to an adjacent group of inlet ports at an angle $\alpha$ around the rotation axis of the rotor, and each of said commutating grooves being unidirectionally staggered relative to an adjacent commutating groove at an angle $\beta$ around the rotation axis of the rotor, so that $\beta - \alpha = \gamma/(K+j)$, where K is the number of groups of inlet ports, $j = 1, 2, 3, \ldots, \alpha \geq 0$, and $\beta \geq 0$.

4. A scanning valve as claimed in claim 16 wherein: said command signal generator is a photoelectric cell having a rotary cylindrical cup coupled kinematically with said rotor of the commutating unit and having in its wall K+j groups of apertures, each of which is disposed in a plane normal to the rotation axis of the cup and the apertures in each group being arranged along the perimeter of the cylindrical surface of the cup at an angular pitch $\theta = \gamma i$ around the rotation axis of the rotor, where i is the transfer ratio of the kinematic coupling between the rotor of the commutating unit and the cylindrical cup of the command signal generator, each of the groups of apertures being staggered relative to an adjacent group of apertures by an angle $$\delta = \frac{\gamma}{K+j} \cdot i,$$

and a light source and light-sensitive cells arranged on the opposite sides of the cup wall.

5. A scanning valve as claimed in claim 4, wherein: said cylindrical cup of the command signal generator is rotatable relative to said rotor to ensure coarse adjustment of the moments of generation of command signals, and said light source and light-sensitive cells are movable relative to the cup wall to ensure fine adjustment of the moment of generation of command signals.

6. A scanning valve as claimed in claim 3, further including an indicator of the number of a point where pressure is measured, said indicator being a transducer converting the angular position of said rotor of the commutating unit to an electrical signal.

7. A scanning valve as claimed in claim 6, wherein: said point number indicator to show the point where pressure is measured is a photoelectric cell converting the angular position of said rotor of the commutating unit to an electrical signal, said cell including a rotary cylindrical cup coupled kinematically with said rotor and having on its cylindrical surface groups of apertures arranged in planes normal to the rotation of the cup and carrying information on the numbers of the pressure measurement points; a light source and light-sensitive cells disposed on the opposite sides of the cylindrical wall of the cup.

* * * * *